Jan. 12, 1932.  J. R. CROSS  1,840,767

CHUCK

Filed May 29, 1930

INVENTOR
John R. Cross
BY
H. Haye Martin
his ATTORNEY

Patented Jan. 12, 1932

1,840,767

UNITED STATES PATENT OFFICE

JOHN RAYMOND CROSS, OF PAINTED POST, NEW YORK, ASSIGNOR OF ONE-HALF TO WILLIAM SPOOR, OF PAINTED POST, NEW YORK

CHUCK

Application filed May 29, 1930. Serial No. 456,852.

This invention relates to improvements in chucks and more particularly to chucks for holding taps such as are used for cutting screw threads.

The object of the present invention is to accurately center the tap in the chuck and to positively drive it without injuring the tap shank.

Another object is to drive the tap in such a manner as to avoid straining the centering jaws.

A further object is to reduce the number of tools required to properly support and drive taps whose sizes vary over a wide range and hence effect economies in machine shop practice.

The above and other objects may be accomplished by employing my invention which embodies among its features a chuck body having centering jaws for gripping the shank of a tap and locating it accurately in the longitudinal center of the body, and driving jaws which will engage the square end of the tap shank so that driving power imparted to the chuck will be transmitted to the tap, independently of the centering jaws.

Other features include, the mounting of the driving jaws in such a manner that they will float into proper position with relation to the centering jaws as they grip the tap shank and the supporting of the springs employed for expanding the centering jaws in such a manner that the latter may be adjusted to hold taps whose sizes vary over a wide range.

Figure 1:
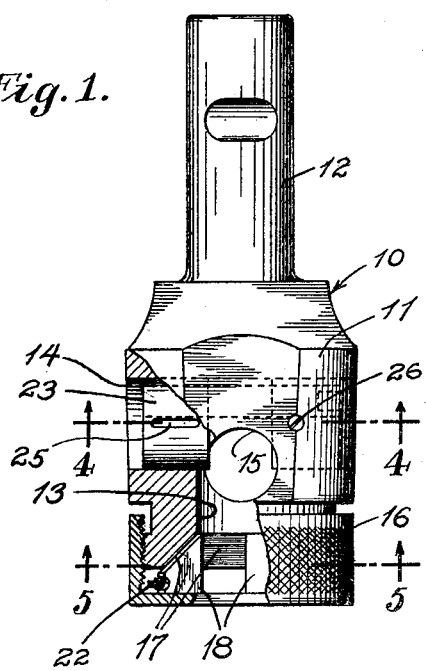
Fig. 1 is a side view partly in section of a chuck constructed in accordance with this invention.
Figure 2:
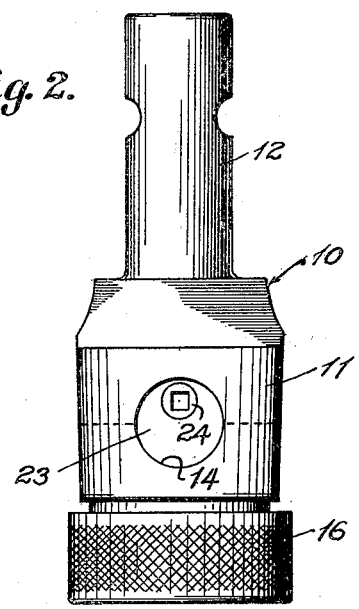
Fig. 2 is a view taken at right angles to Fig. 1.

Referring to the drawings in detail, the chuck designated generally 10 comprises a substantially cylindrical body 11 which is provided at one end with a shank 12. Formed in the end of the body opposite the shank is an axial bore 13 forming a socket into which the shank of a tap is inserted. Extending transversely through the body 11 at the inner end of the bore 13 is an opening 14 and a sight opening 15 extends through the body at right angles to the opening 14 as will be clearly seen upon reference to Fig. 1.

The end of the body opposite the shank 12 is reduced in cross-section and is formed with external screw threads for cooperation with internal screw threads formed in a nut 16 by means of which centering jaws, to be more fully hereinafter described, are adjusted. The outer end of the bore 13 is bevelled as at 17 and slidably mounted in spaced relation on this bevelled surface are the centering jaws 18. Each centering jaw consists of a segment of a cone with its bevelled face disposed in sliding contact with the bevelled face 17 so that as the nut 16 is advanced toward the body 11 the jaws will uniformly advance toward each other and grip any object which extends into the socket. In order to cause the jaws to expand as the nut is retracted from the body 11, each jaw is provided with a bore 19 which extends parallel to its bevelled face and contains a retractile coiled spring 20 whose inner end is anchored to a pin 21 while its outer end is engaged through an opening in a supporting ring 22. It will thus be seen that as the jaws are moved toward each other to grip the shank of a tap, the springs 20 will be placed under tension, and hence as pressure on the ends of the jaws is relieved, the latter will move away from contact with the tap shank under the influence of the springs 20.

Figure 4:
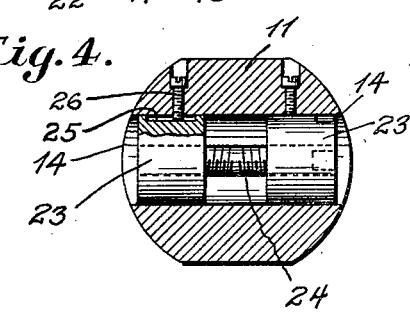
Fig. 4 is a sectional view taken on the line 4—4 of Fig. 1.
Figure 3:
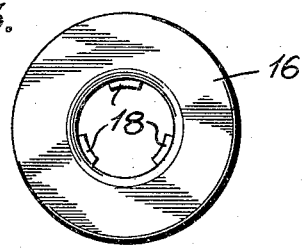
Fig. 3 is an end view of Fig. 2.
Figure 5:
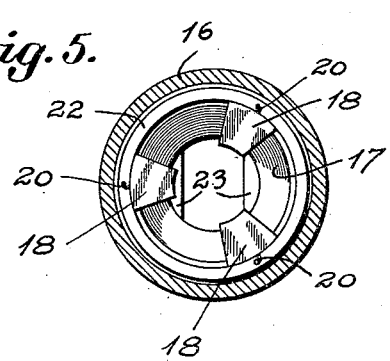
Fig. 5 is a sectional view taken on the line 5—5 of Fig. 1.
Figure 6:
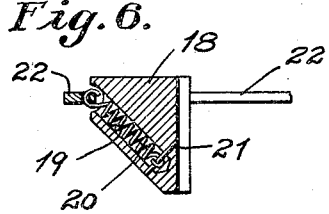
Fig. 6 is an enlarged detail sectional view through one of the centering jaws.

In order to relieve the centering jaws of driving strain and avoid marring the tap shank, I provide a pair of driving jaws 23 which are slidable in the bore 14 and are relatively adjustable by turning a screw 24. The latter is provided with right and left threads so that upon turning it in one direction the jaws may be advanced while upon turning it in the opposite direction the jaws may be retracted. These jaws engage the flat faces usually formed on the end of a tap shank and transmit rotary motion imparted to the body 11 directly to the tap. In this manner, the centering jaws 18 are relieved from any driving strain. In order to hold the driving jaws 23 in proper position in the bore 14 and yet allow them to adjust themselves properly with relation to the shank of a tap which may be inserted in the socket, I provide each driving jaw with a slot 25 into which the end of a set screw 26 projects. These set screws are carried by the body 11 and their heads are countersunk as illustrated in Fig. 4 so as to eliminate objectionable projections which might cause injury to persons or property when the chuck is rotating.

In operation, the shank of a tap is introduced into the socket whereupon the screw 24 is rotated to advance the drivers into clamping position on the square end of the tap. The nut 16 is then advanced toward the body 11, thereby moving the centering jaws 18 into gripping relation to the tap shank. As the shank is centered by the centering jaws, the drivers will automatically adjust themselves and proper alignment of the tap in the chuck is assured. Since the driving of the tap is done independently of the centering jaws, it becomes obvious that no torsion is transmitted to the smooth cylindrical surface of the tap shank and any tearing or marring of the surface is avoided so that accurate centering of the tap is always assured. By employing retractile coiled springs to actuate the centering jaws, I am enabled to produce a chuck which will take taps of widely differing diameters and I am further enabled thereby to reduce the number of chucks which it has heretofore been necessary to stock.

While in the foregoing, there has been shown and described the preferred embodiment of my invention, it is to be understood that minor changes in the details of construction, combination and arrangement of parts may be resorted to without departing from the spirit and scope of the invention as claimed.

I claim:

1. A chuck having a socket for receiving the shank of a tap, a bevelled face on the chuck at the outer end of the socket, centering jaws slidable on the bevelled face, an anchoring ring surrounding the centering jaws, retractile coiled springs connected to the ring and to the jaws to yieldingly urge said jaws apart, and a nut threaded on the chuck for engaging the outer ends of the centering jaws and moving the latter over the bevelled face against the tension of the springs and independently adjustable driving jaws adjacent the inner end of the socket.

2. A chuck having a socket for receiving the shank of a tap, a bevelled face on the chuck at the outer end of the socket, centering jaws slidable on the bevelled face, an anchoring ring surrounding the centering jaws, retractile coiled springs connected to the ring and to the jaws to yieldingly urge said jaws apart, and a nut threaded on the chuck for engaging the outer ends of the centering jaws and moving the latter over the bevelled face against the tension of the springs, and driving jaws at the inner end of the socket for engaging the shank of a tap and relieving the centering jaws of driving strain.

JOHN RAYMOND CROSS.